Dec. 29, 1964  E. PORTER  3,162,953
INTERNAL BORE MEASURING APPARATUS
Filed Feb. 16, 1962  6 Sheets-Sheet 1

INVENTOR
EDWARD PORTER

BY *Shoemaker and Mattare*

ATTORNEYS

Dec. 29, 1964 E. PORTER 3,162,953
INTERNAL BORE MEASURING APPARATUS
Filed Feb. 16, 1962 6 Sheets-Sheet 2

INVENTOR
EDWARD PORTER
BY Shoemaker and Mattare
ATTORNEYS

Dec. 29, 1964     E. PORTER     3,162,953

INTERNAL BORE MEASURING APPARATUS

Filed Feb. 16, 1962     6 Sheets-Sheet 3

INVENTOR
EDWARD PORTER

BY *Shoemaker and Mattare*
ATTORNEYS

Dec. 29, 1964 E. PORTER 3,162,953
INTERNAL BORE MEASURING APPARATUS
Filed Feb. 16, 1962 6 Sheets-Sheet 4

INVENTOR.
EDWARD PORTER
BY
Shoemaker and Mattare
ATTORNEYS

Dec. 29, 1964  E. PORTER  3,162,953
INTERNAL BORE MEASURING APPARATUS
Filed Feb. 16, 1962  6 Sheets-Sheet 5

INVENTOR
Edward Porter
BY Shoemaker and Mattare
ATTORNEYS

Dec. 29, 1964  E. PORTER  3,162,953
INTERNAL BORE MEASURING APPARATUS
Filed Feb. 16, 1962

INVENTOR
*Edward Porter*
BY *Shoemaker and Mattare*
ATTORNEYS

United States Patent Office 3,162,953
Patented Dec. 29, 1964

3,162,953
INTERNAL BORE MEASURING APPARATUS
Edward Porter, 4221 Woodlake Drive, Fort Worth, Tex.
Filed Feb. 16, 1962, Ser. No. 173,521
5 Claims. (Cl. 33—174)

The present invention relates to a new and novel internal bore measuring apparatus, and more particularly to an apparatus for precisely measuring the angular disposition of a bore as well as the internal dimension thereof.

The present application is a continuation-in-part of my copending United States application Serial No. 83,130, filed January 9, 1961.

In many industrial applications, holes must be drilled in surfaces such as in the block of an engine or similar applications, these holes being drilled with a high degree of accuracy such that they are required to have a particular angular relationship and a precise inner dimension. Of course, these holes may comprise a bore in a shaft or may simply be a hole formed in a large flat surface or even a curved surface. After so forming these holes, it is necessary to determine that the holes have been accurately and properly formed. In order to check and measure the holes or bores, it is of course necessary to provide a measuring instrument or apparatus which is adapted to quickly and accurately determine if the hole has been formed according to specifications.

Firstly, it is necessary to determine with a high degree of accuracy that the hole has been properly angularly oriented and in most applications the holes or bores will be formed at an angle of 90° to the associated surface of the member in which the bore is formed. In addition, a second consideration is to provide apparatus which readily indicates whether or not the hole or bore is formed of a proper internal dimension.

The present invention relates to an apparatus for quickly and efficiently performing the dual function of measuring the internal dimension of the bore as well as the angularity thereof relative to the associated surface.

In the present invention, a body means is provided having a novel lower supporting portion which is so constructed as to universally adapted itself to various surfaces. In other words, the support means enables the body means to be effectively supported either upon a flat or a curved surface. This is accomplished by providing a plurality of spaced leg members at the lower portion of the body means.

The angularity of the bore is determined by means of an arm which is pivotally supported by the body means and is adapted to register with a scale formed on or supported by the body means, the position of the arm being determined by the angular relationship of the bore.

A plug gauge means is removably secured to the lower end of the pivotal arm of the apparatus, the plug gauge means fitting within the bore to thereby position the arm in a certain location. In addition, the plug gauge means is provided with a precise outer dimension such that the internal dimension of the bore can be accurately checked. It will of course be realized that if the bore is to have a specific internal dimension, the outer dimension of the plug gauge means can be provided with a similar dimension. In this case, if the plug gauge means fails to enter the bore, it indicates that the bore is of too small an internal dimension. In cases where the bore is to have certain predetermined tolerances, the plug gauge means may be formed of the conventional type known as "go, no-go." In either case, it is apparent that the plug gauge means is adapted to accurately check the internal dimension of the bore.

An additional feature of the present invention is the provision of a two-piece body means wherein the lower supporting portion of the device may be interchanged as desired. The interchangeable lower portions of the body means are provided with supporting leg portions, the relative spacing of which is varied such that the lower portions may be interchanged in accordance with the contour of the supporting surface within which the bore or hole is formed, and further according to the size of the bore itself.

In a modification of the invention, a novel arrangement is provided wherein the supporting leg portions are adjustably secured to the body means such that they may be readily moved toward and away from one another to accommodate for various operating conditions.

A further novel feature of the invention is the provision of an accurately adjustable plug gauge means wherein the outer dimension thereof can be readily adjusted to precisely measure the internal dimensions of bores of different sizes.

The apparatus of the present invention is especially constructed to provide a plurality of components which may be quickly and easily interchanged with one another to obtain maximum versatility and to enable the components to be readily removed and replaced as desired.

Another novel feature of the invention is the fact that the plug gauge means may be so constructed as to have a certain predetermined longitudinal dimension. In this manner, the depth of the bore may be accurately checked to determine that the depth is within predetermined limits.

An object of the present invention is to provide a new and novel bore measuring apparatus which is adapted to precisely measure the angularity of a bore with respect to an associated surface.

Another object of the invention is the provision of internal bore measuring apparatus which is adapted to accurately check the internal diameter of a bore.

A further object of the invention is to provide apparatus for not only measuring the angularity and internal dimension of a bore, but also which may be employed for checking the depth of a bore.

Yet another object of the invention is to provide internal bore measuring apparatus which is readily adjustable such that it may be employed with bores of different sizes.

Still another object of the invention is to provide internal bore measuring apparatus including means for readily adjusting the position of the supporting leg portions with respect to one another.

A still further object of the invention is the provision of internal bore measuring apparatus which is quite simple, compact and inexpensive in construction, yet which is quite reliable in operation.

A still further object of the invention is to provide internal bore measuring apparatus including a multiplicity of components which are readily interchangeable with one another.

Other objects and many attendant advantages of the invention will become more apparent when considered in connection with the specification and accompanying drawing, wherein:

Referring now to the drawings wherein like reference characters designate corresponding parts throughout the several views, the first modification shown in FIGS. 1–6 includes a body means indicated generally by reference numeral 20, the body means being shown as resting upon the upper surface 21 of any member having a bore 22 formed therein which it is desired to check. It is noted that the body means rests on the upper surface 21 of the member having the bore formed therein, and as mentioned previously, the body means will be supported in such position regardless of whether the surface 21 is flat as shown, or is curved as may sometimes be the case.

Figure 2:
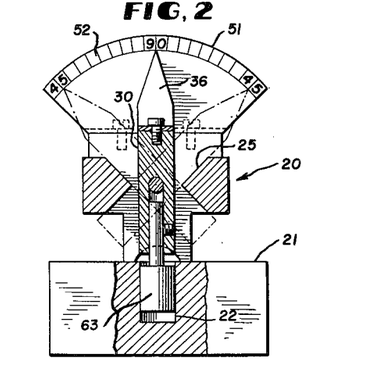
FIG. 2 is a longitudinal sectional view of a portion of the apparatus shown in FIG 1.

The body member 20 is provided with a laterally extending slot indicated by reference numeral 25, this slot defining a more or less X shaped cross section as may be most clearly seen in FIG. 2 thereby permitting pivotal movement of a supported arm with respect to the body means such that the arm can swing through an arc of at least 90°. A bore 26 extends from the front to the rear of the body means as seen most clearly in FIG. 3 and a pivot pin 27 is journalled within this bore and suitably retained in position therein, pin 27 having an enlarged head 28 formed at one end thereof.

Figure 6:
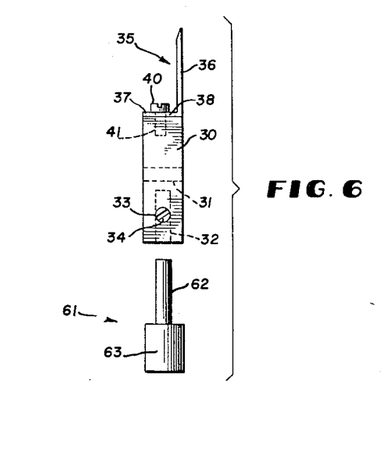
FIG. 6 is an exploded view illustrating the pivotal arm and detachable plug gauge means of the apparatus shown in FIG. 1.

An arm 30 is disposed within the slot, and has a front to back dimension slightly less than that of the slot thereby permitting ready pivotal movement with respect to the body means. The arm 30 as seen most clearly in FIG. 6 is provided with a bore 31 extending from front to back thereof and a second bore 32 is formed in the lower surface of the arm and extends upwardly therein to a point below point 31. A threaded bore 33 is formed in this arm and extends radially into communication with the bore 32, a set screw 34 being threadedly disposed within bore 33 for a purpose hereinafter described.

An indicator member indicated generally by reference numeral 35 includes an upstanding portion 36 which tapers to a point thereby serving to visually indicate the angular position of the indicator means, and a lower arm 37 is provided at right angles to portion 36. An opening 38 is provided in arm 37, and a screw 40 extends downwardly in opening 38 into a threaded opening 41 formed in the upper surface of arm 30. In this manner the indicator means 35 may be readily attached to or removed from the arm 30 thereby permitting the indicator means to be exchanged as desired. It is of course also apparent that the indicator means 35 may be formed as an integral portion of the arm if desired.

Figure 1:
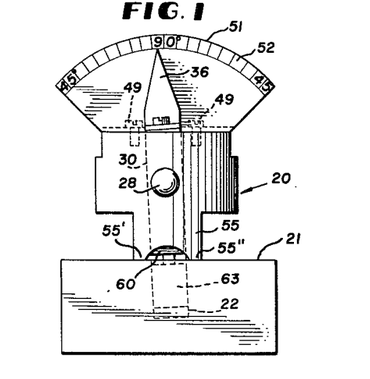
FIG. 1 is an elevation of a first embodiment of the apparatus illustrated in operative position.
Figure 3:
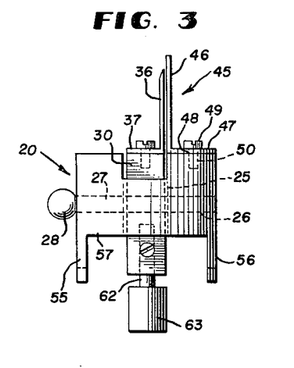
FIG. 3 is a side view of the apparatus shown in FIG. 1.
Figure 4:
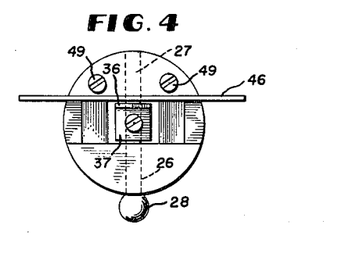
FIG. 4 is a top view of the apparatus shown in FIG. 1.

When the arm 30 is in operative position as shown in FIGS. 1–3, the pivot pin 27 extends through the bore 31 of the arm and pivotally supports the arm with respect to the body means.

A further indicating means is illustrated generally by reference numeral 45 and includes an upstanding arm 46 as well as an integral arm 47 extending substantially normally to arm 46. As shown, arm 47 is provided with a pair of openings 48, and a pair of screws 49 are threaded downwardly through the openings in arm 47 into cooperating threaded openings 50 formed in the body means. In this manner, the indicating means 45 is removably attached to the body means and can be interchanged whenever it is desired to provide different scales or the like. As seen in FIGS. 1 and 2, the upper edge 51 of arm 46 is of generally arcuate configuration, and a scale 52 is formed on portion 46 adjacent the arcuate periphery 51 thereof. As shown, the scale is so marked that 90° appears at the central portion of the scale, and 45° is marked at a 45° relationship to either side of the 90° mark. It is evident that the pointed indicator portion 36 cooperates with the scale to indicate the angular relationship of the bore with respect to the supporting surface 21. Accordingly, if the bore is formed at an angle of 90° with respect to surface 21, a reading of 90° will be obtained.

As seen in FIG. 3, body means 20 is provided with a depending flange 55 at the front portion thereof and a depending flange 56 is formed at the rear thereof. These flanges serve to elevate the under surface 57 of the body means a substantial distance above the supporting surface with which the apparatus is associated. As seen especially in FIG. 1, flange 55 is provided with an arcuate cut out portion 60 at the central area thereof thereby providing a first leg portion 55′ and a second leg portion 55″. In a similar manner the rear flange 56 is cut away at the central lower portion thereof to provide a pair of spaced leg members.

Figure 5:
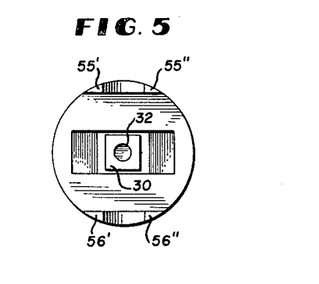
FIG. 5 is a bottom view of the apparatus shown in FIG. 1.

It is accordingly apparent that the lower portion of the body means includes four spaced leg portions 55′, 55″, 56′ and 56″ as seen clearly in FIG. 5 of the drawings. These four spaced leg members serve to firmly support the body means in operative position, and it is evident that they will support the body means either on a flat surface as shown or a curved surface, and that accurate measurements may be obtained in either case.

Referring again to FIG. 6, a plug gauge means is indicated generally by reference numeral 61, the gauge including an upper cylindrical shank portion 62 which is received within the bore 32 of arm 30 and held in place by set screw 34. Gauge means 61 also includes a lower portion 63 which is provided with a precise outer dimension which corresponds to the desired dimension of the bore to be checked. For example, if the bore should have a certain predetermined diameter, portion 63 will be provided with the corresponding diameter, and when the measuring apparatus is to be employed with the hole or bore, the lower portion 63 must first enter the bore thereby indicating that the bore is not of a less diameter than desired.

Figure 7:
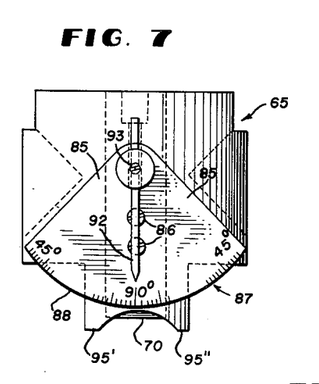
FIG. 7 is an elevation of a modified form of the invention.
Figure 8:
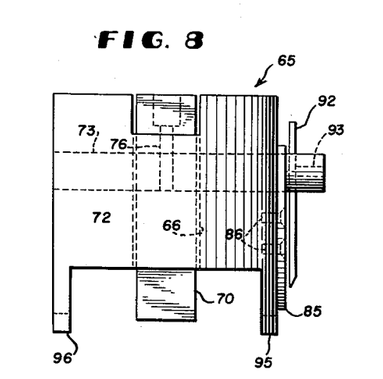
FIG. 8 is a side view of the apparatus shown in FIG. 7.
Figures 9, 10, 11:
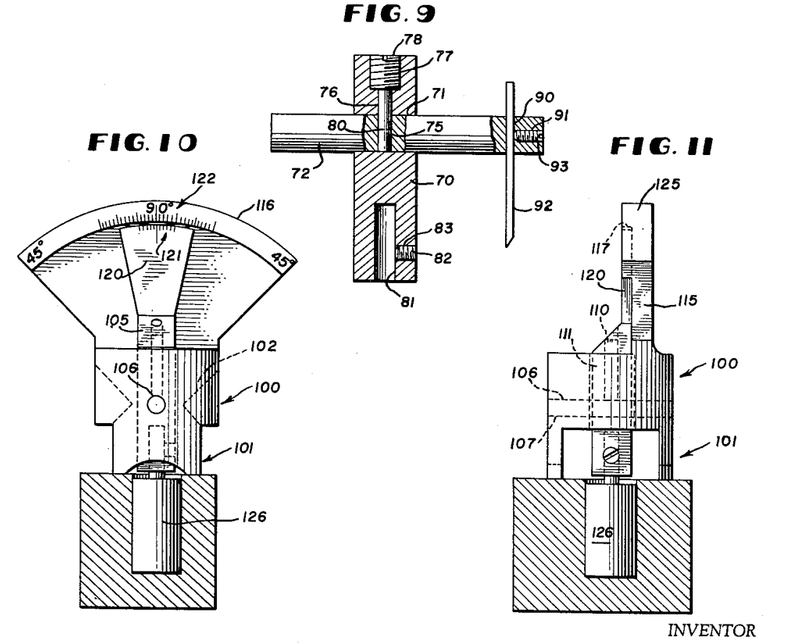
FIG. 9 is a view partly in section of the pivotal arm along with the pivot pin and indicator member of the apparatus shown in FIG. 7.
FIG. 10 is an elevation of a still further modified form of the invention.
FIG. 11 is a side view of the apparatus shown in FIG. 10.

Referring now to FIGS. 7–9 which illustrate a further modification of the invention, the basic principles remain substantially the same, but the structure has been altered somewhat in order to provide a more compact structure, and one which may be quite simply assembled and disassembled. In this modification, the body means is indicated generally by reference numeral 65 and includes laterally extending slot 66 formed therein in a manner similar to the slot 25 formed in the apparatus previously described. An arm member 70 as seen in FIG. 9 is disposed for pivotal movement within the slot, the arm 70 having a bore 71 formed therethrough which receives a pivot pin 72. A bore 73 is formed through the body means as seen in FIG. 8, and the pin 72 is journalled within the bore and suitably held in place therein.

As seen in FIG. 9 a radially extending bore 75 is provided in pivot pin 72 and a bore 76 formed in the arm member 70 is aligned therewith. Bore 76 is then in communication with an enlarged bore 77 which is threaded and which opens to the upper surface of the arm. A locking pin includes an enlarged threaded head 78 which is received within the threaded bore 77, and also includes a depending shank portion 80 which extends through aligned bores 76 and 75 formed in the arm and the pivot pin respectively. It is apparent that the locking pin retains the arm and pivot pin in operative relationship to one another.

The lower portion of arm 70 includes an upwardly extending bore 81 for receiving the upper portion of a plug gauge means, and a set screw 82 is adjustably mounted within a radially extending threaded opening 83 which communicates with bore 81. It is evident that this structure permits various plug gauge means to be adjustably attached to the arm.

As seen in FIGS. 7 and 8, a dial plate 85 is attached to the forward end of the body means by means of a pair of screws 86 which extend through suitable openings in the dial plate and into correspondingly threaded openings in the body means. Dial plate 85 is provided with a scale indicated by reference numeral 87 in FIG. 7 along the lower arcuate edge portion 88 thereof.

Pivot pin 72 is also provided with a radially extending bore 90, and a longitudinally extending bore 91 communicates with bore 90. A pointer or indicator member 92 is removably disposed within bore 90, and a set screw 93 is mounted within bore 91 for retaining the indicator member 92 in operative position as shown wherein indicator member 92 extends parallel within arm 70 such that it accurately reflects angular movements of the arm 70. It is also evident that indicator 92 cooperates with the scale on the dial plate 85 for indicating the angular relationship of the bore when the device is in operation.

It will also be noted that the lower portion of body means 65 is provided with front and rear flanges 95 and 96 which are cut away at the central portion thereof in the manner of the device shown in FIGS. 1–3 to provide four spaced leg portions, two of which are indicated by reference numerals 95′ and 95″ in FIG. 7.

Referring now to FIGS. 10 and 11 of the drawings, a further modification is illustrated wherein the body means is indicated generally by reference numeral 100, the body means being provided with a lower supporting portion 101 having four spaced legs formed as previously described, and the body means also having a slot 102 formed therein. An arm 105 is disposed within a slot and is supported by a pivot pin 106 mounted within a suitable bore 107 formed in the body means. The pin 106 extends through a suitable bore formed in the arm, and a set screw 110 extends downwardly through a vertically extending bore 111 formed in the arm for removably attaching the arm to the pivot pin 106.

Secured integrally to the upper surface of the body means is an upstanding dial plate 115 having an arcuate upper edge 116, the plate being undercut at 117 to provide a cut out portion for receiving an upstanding portion 120 of the arm 105. The upper edge of portion 120 of the arm is also of an arcuate configuration and is provided with a scale 121 formed along the edge thereof. A scale 122 is formed along the forward edge of the upper part 125 of dial plate 115, and it is apparent that a reading may be obtained by observing the scales formed on the two members. If desired, the scales may comprise Vernier scales or the like in order to obtain more accurate readings.

In this modification just as in the previous modifications, a plug gauge means 126 is removably attached to the lower end of the arm and is adapted to be inserted within the bore to be measured, it being understood that here again the plug gauge means is of a precise outer dimension.

Figure 12:
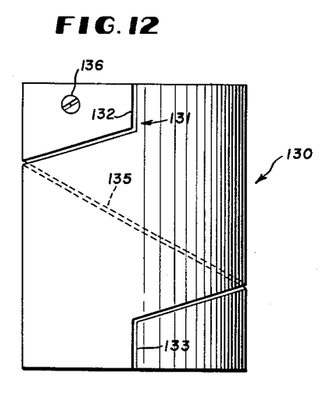
FIG. 12 is an elevation of an adjustable plug gauge member for use with the present invention.
Figure 13:
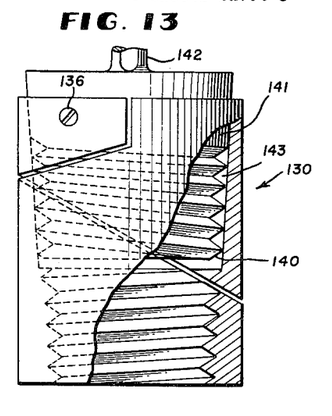
FIG. 13 is a view partly broken away illustrating the member shown in FIG. 12 in cooperation with an expander means.

Referring now to FIGS. 12 and 13 of the drawings, a modification is illustrated depicting an adjustable plug gauge means, the outer diameter of which may be readily and accurately adjusted. This adjustable gauge means includes a tubular member indicated generally by reference numeral 130, the tubular member being formed of a suitable resilient material such as spring steel whereby it normally assumes its minimum diameter, and may be expanded to larger sizes as will hereinafter appear.

The tubular member is split longitudinally thereof, and thereby forms a slot indicated by reference numeral 131, the slot including an upper portion 132 and a lower portion 133 which are substantially aligned with one another and which extend a minor portion of the longitudinal dimension of the tubular member. The lower part of slot portion 132 is connected to the upper part of slot portion 133 by a slot portion 135 which defines a substantially helical bar around the outer periphery of the tubular member. It is evident that slot 131 permits the tubular member to expand and contract while at all times retaining an outer configuration defining a cylindrical surface. A radially extending threaded opening is provided through the wall of the tubular member and a set screw 136 is threaded through the opening for a purpose hereinafter described.

As seen most clearly in FIG. 13, the inner surface of tubular member 130 is provided with a lower threaded portion 140, the threaded portion 140 as well as the wall portion thereabove being tapered downwardly and inwardly toward the lower portion of the tubular member.

An expander member 141 includes a shank portion 142 which extends upwardly therefrom and which is adapted to be detachably secured to the lower end portion of the pivoted arm of the apparatus hereinbefore described as will be well understood. The lower portion of expander member 141 is also provided with a tapered thread 143 formed on the outer surface thereof, thread 143 being tapered complementary to the taper of thread 140 such that the threaded portions 143 and 140 are adapted to intercooperate with one another such that upon threading of the expander member 141 downwardly within the tubular member 130, the tubular member will be expanded to any desired diameter.

Figures 14, 17:
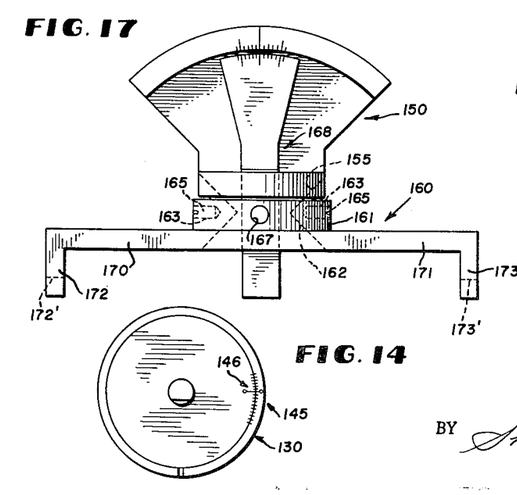
FIG. 14 is a top view of the assembly shown in FIG. 13.
FIG. 17 is a view illustrating the top portion shown in FIG. 15 and FIG. 16 in operative relationship with a lower body portion.

As seen in FIG. 14, the upper edge of the tubular member 130 is provided with a scale 145, and the upper surface of the expander member 140 is provided with a cooperating scale 146 formed adjacent the outer periphery thereof. The two scales 145 and 146 indicate the relative angular position of the tubular member and the expander member, and the scale is so calibrated as to indicate the outer diameter of the tubular member in accordance with the angular relationship of the expander member to the tubular member, and consequently the degree to which the expander member is threaded downwardly into the tubular member.

It is evident that when utilizing the adjustable plug gauge means illustrated in FIGS. 12–14, the expander member may first be inserted within the tubular member and threaded therein to the desired extent whereupon the tubular member will assume the desired outer diameter for checking a particular size bore. When the tubular member and the expander member have been so adjusted, the two members may be locked in the desired operative position by means of set screws 136.

Referring now to FIGS. 15–18 of the drawings, a modified form of body means is illustrated wherein the body means is formed of two detachable portions.

Figure 15:
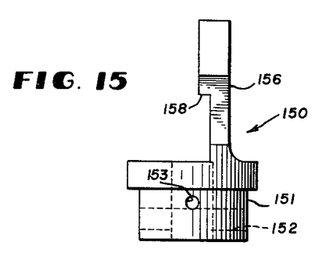
FIG. 15 is a side view of the top portion of a two-piece body means according to the present invention.
Figure 16:
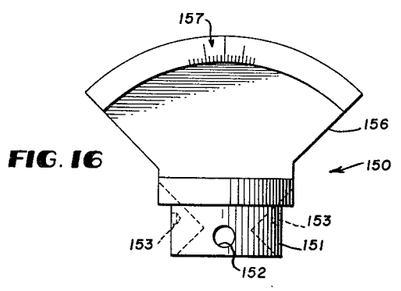
FIG. 16 is a front view of the member shown in FIG. 15.

FIGS. 15–16 illustrate the upper portion of this modified form of the body means, the upper portion being indicated generally by reference numeral 150, and including a lower part 151 having an outer surface of cylindrical configuration. A bore 152 is formed through part 151, and is adapted to receive the pivot pin for supporting the pivotal arm in operative position relative to the body means. A pair of threaded openings 153 are formed in diametrically opposite portions of the lower part 151 for receiving a pair of set screws as hereinafter described. A laterally extending slot 155 is also formed through the upper portion 150 of the body means of this modification to permit pivotal movement of the arm when disposed in operative position therewithin.

The upper part of portion 150 is indicated by reference numeral 156 and is generally fan shaped, a scale 157 being formed on the forward surface thereof in a manner similar to the modification shown in FIGS. 10 and 11. Upper part 156 is also undercut at 158 as see in FIG. 15 in order to accommodate the adjacent portion of the pivotal arm.

Figure 18:
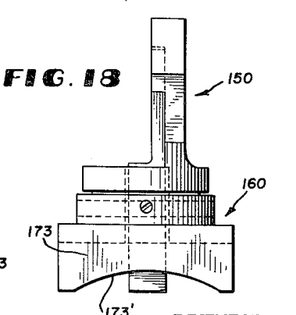
FIG. 18 is a side view of the apparatus shown in FIG. 17.

Referring now particularly to FIGS. 17 and 18, the upper portion of this modified form of the body means is shown in operative position with the cooperating lower portion. The lower portion is indicated generally by reference numeral 160 and includes a central boss 161 having a cylindrical opening 162 formed therethrough, opening 162 receiving the cylindrical part 151 of the upper portion 150.

A pair of threaded openings 163 are provided through diametrically opposite portions of the wall of the boss 161, and set screws 165 are threaded within aligned openings 163 of the boss and 153 of the upper portion thereby retaining the upper and lower portions in operative relationship to one another.

A pivot pin 167 extends through aligned openings formed in the boss 161 and the bore 152 of the upper portion, and the pivot arm indicated generally by reference numeral 168 is pivotally supported on this pivoted pin, the lower portion of the arm also being provided with means for detachably securing a gauge means thereto.

Lower portion 160 includes oppositely extending arm portions 170 and 171 having depending flanges 172 and 173 formed integrally at the outer end portions thereof respectively. As seen particularly in FIG. 18, each of the depending flange portions 172 and 173 have a central cutout portion 172' and 173' to define a pair of spaced leg portions on each flange whereby four spaced legs are provided for supporting the body means in operative position.

The lower portion 160 as shown in FIGS. 17 and 18 is merely illustrative of one particular size lower portion which may be employed with the upper portion. It should be understood that various other lower portions may be provided similar to legs 170 and 171 which extend laterally to either a greater or lesser extent depending on the size of the bore being tested or other surface characteristics of the supporting surface which may require various distances between the supporting legs.

Referring now to FIGS. 19–22, a modified form of adjustable plug gauge means is illustrated, this plug gauge means being also so constructed that the outer diameter thereof may be readily and accurately adjusted. As seen most clearly in FIG. 20, a spindle 180 is provided, this spindle being adapted to be received within the bore 181 formed in the lower surface of the pivoted arm 182 of the apparatus hereinbefore described. Spindle 180 may be provided with a flat 183 adapted to be engaged by a set screw 184 mounted in the lower end of the arm 182 for rigidly attaching the spindle 180 to the pivotal arm.

Figures 19, 20, 21, 22, 23, 24, 25:
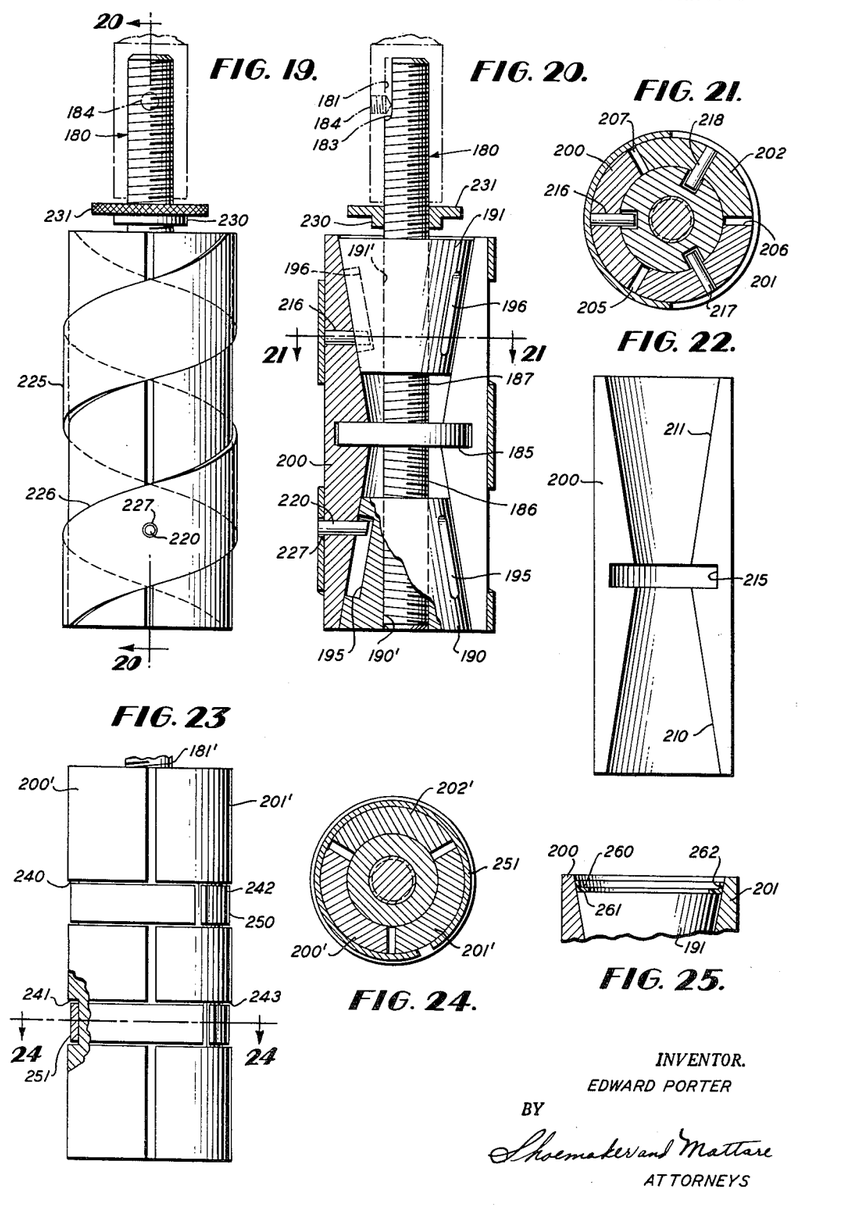
FIG. 19 is an elevation of a modified form of adjustable plug gauge means for use with the present invention.
FIG. 20 is a longitudinal section taken substantially along line 20—20 of FIG. 19 looking in the direction of the arrows and being partially broken away.
FIG. 21 is a sectional view taken along line 21—21 of FIG. 20 looking in the direction of the arrows.
FIG. 22 is an elevation of one of the expanding sections of the apparatus shown in FIGS. 19–21.
FIG. 23 is an elevation view partly broken away of a further modified form of the adjustable gauge means.
FIG. 24 is a sectional view taken along line 24—24 of FIG. 23 looking in the direction of the arrows.
FIG. 25 illustrates a sealing means adapted to be incorporated in the device as shown in FIGS. 19–24.

A radially extending collar 185 is formed at an intermediate portion of the spindle and the purpose of this collar will be hereinafter more fully described.

The spindle is threaded on both sides of the collar 185 and it should be noted that the lower threaded portion 186 is threaded oppositely from the upper threaded portion 187.

A pair of expanding plugs 190 and 191 are threaded upon the portions 186 and 187 respectively of the spindle, the threaded portions of the spindle extending through correspondingly threaded bores 190' and 191' formed in the two plugs respectively. The arrangement is such that upon relative rotation of the spindle with respect to the plugs in one direction, the plugs will be advanced toward one another while upon relative rotation of the spindle in the opposite direction with respect to the plugs, the plugs will be moved away from one another in a well-understood manner.

It will be noted that each of the expanding plugs 190 and 191 is provided with an outer surface which is substantially frusto-conical in configuration. In addition, the outer surface of the lower expanding plug 190 is provided with three equally angularly spaced grooves or slots 195 only two of which are visible in FIG. 20. In a like manner, the upper expanding plug 191 is provided with three equally angularly spaced grooves or slots 196.

As can be seen most clearly in FIG. 21, a plurality of expanding sections 200, 201 and 202 shown as being three in number are formed separately of one another, and are of substantially identical construction. It is evident that each of these sections is so constructed as to have a cross sectional configuration comprising a pair of arcs of a circle joined by radial lines. As can be seen in FIG. 21, the sections are so dimensioned such that the longitudinally extending edges thereof are always spaced from one another so as to define the spaces 205 and 206 and 207 between the adjacent longitudinal edges of the sections.

Referring now to FIG. 22, an elevation view of expanding section 200 is illustrated, and as seen in this view, a first tapered substantially frusto conical recess 210 is provided at the lower portion thereof and a similar tapered frusto conical recess 211 is formed at the opposite end thereof. The two frusto conical recesses taper inwardly toward the center of the expanding section, and are in communication with an arcuate recess 215. Arcuate recess 215 is adapted to snugly receive a portion of the collar 185 formed on the spindle to thereby support the various expanding sections on the collar of the spindle and to prevent relative longitudinal displacement thereof.

The configuration of recesses 210 and 211 are complementary to the outer surface of the expanding plugs 190 and 191 such that the expanding plugs are snugly received within the recesses formed in the various expanding sections. It is evident that when the expanding sections are assembled, as seen in FIG. 21, they will be disposed in surrounding relationship to the associated expanding plugs.

In order to prevent relative rotation between the expanding plugs and the expanding sections during operation of the apparatus and to further center the various expanding sections with respect to the plugs, each of the expanding sections is provided with a radially inwardly extending pin. As seen in FIG. 21, pins 216, 217, 218 extend inwardly from the central portions of the sections 200 and 201 and 202 respectively. These pins are disposed centrally considering the lateral dimension of the sections, but as seen in FIG. 20 it will be noted that pin 216 which appears in that view is disposed at the upper portion of the section 200 considering the longitudinal dimension thereof. Similar pins are also disposed at the lower ends of the various sections 200, 201 and 202, and as seen in FIG. 20, a pin 220 similar to pin 216 also extends radially inwardly of the central portion of expanding section 200. It will be understood that in a similar manner, radially inwardly extending pins are provided in sections 201 and 202 in the same horizontal plane as pin 220 of section 200 and disposed directly vertically below pins 217 and 218 respectively. The latter two described pins are not seen in the drawings.

The arrangement is such that each of the pins extending inwardly from one of the expanding sections is disposed within one of the grooves or slots formed in the outer surface of the associated plug means 190 or 191. It is accordingly evident that the pins positively prevent any relative rotation between the plugs 190, 191 and associated expanding sections 200 and 201 and 202 and further serve to maintain the expanding sections in spaced relationship from one another at all times.

A resilient tubular means 225 is disposed in surrounding relationship to the two expanding sections. Member 225 may be formed of spring steel or similar resilient material, and is provided with a slot 226 which enables it to expand and contract in the desired manner. Slot 226 as shown will be substantially helical. The outer surface of tubular member 225 defines portions of a cylindrical surface, and is obviously adapted to be seated within a cylindrical bore formed in a workpiece. Resilient tubular member 225 serves to maintain the expanding sections and plug means in operative relationship to one another, and an opening 227 is provided through a lower portion of the tubular resilient member which loosely receives pin 220 which extends outwardly a short distance radially from the expanding section 200. Pin 220 in cooperation with opening 227 formed in the resilient tubular member 225 serves to positively limit longitudinal displacement of the tubular member with respect to the expanding sections.

It is evident that by rotating the spindle 180 with respect to the plugs 190 and 191, the expanding sections and the tubular member may be either expanded or contracted according to the direction of rotation of the spindle. When the spindle has been rotated to adjust the outer diameter of the tubular member 225 to the desired dimensions, the device may be locked in adjusted position by means of a lock nut 230 having an enlarged radially extending flange portion 231, the outer surface of which is knurled so as to facilitate manual grasping thereof.

It is apparent that by advancing the lock nut 230 against the upper surface of plug 191, the apparatus may be locked in a desired adjusted position.

Referring now to FIGS. 23 and 24, a further modification of the adjustable plug means is illustrated. In this modification, which is quite similar to that shown in FIGS. 19–22, the expanding sections 200' and 201' and 202' are similar to expanding sections 200, 201 and 202 of the previous modification; the identical spindle, tapered plugs and pin means are provided for moving the expanding sections radially inwardly and outwardly with respect to the spindle which is indicated in this modification by reference numeral 181'.

In this latter modification, the outer resilient tubular member 225 is eliminated and the outer arcuate surfaces of the expanding sections 200', 201' and 202' themselves are employed for measuring the internal diameter of a bore to be measured. In order to retain the expanding sections 200', 201' and 202' in operative relationship, grooves are provided in the outer surfaces thereof within which resilient spring means is seated. Each of the expanding sections is provided with a pair of spaced laterally extending grooves formed in the outer surface thereof. As seen in FIG. 23, expanding section 200' is provided with a pair of spaced laterally extending grooves 240 and 241. Expanding section 201' is likewise provided with laterally extending spaced grooves 242 and 243. It will be noted that the grooves of adjacent expanding sections are aligned with one another. In a similar manner, the remaining expanding section 202' is provided with a pair of spaced annular grooves which are aligned with the annular grooves formed in the other expanding sections.

A first resilient split ring 250 is seated in the upper series of grooves and a second resilient ring 251 is seated in the lower series of grooves formed in the expanding sections. Each of split rings 250 and 251 may be formed of spring steel or similar material which tends to contract inwardly to thereby draw the expanding sections toward one another, thereby maintaining them in operative position.

It is apparent that the operation of the modification shown in FIGS. 23 and 24 is substantially identical with that shown in FIGS. 19–22 with the exception that the outer surfaces of the expanding sections themselves are employed for engaging the inner surface of a bore to be measured.

Referring now to FIG. 25, a further modification is illustrated which may be employed with either of the modifications shown in FIGS. 19–22, or 23 and 24. As shown in this modification a seal is illustrated as employed with the arrangement shown in FIGS. 19–22. In order to seal the interior of the apparatus from the entry of foreign material, an annular seal 260 may be bonded to the outer surface of each of the plugs 190 and 191. As illustrated, the seal 260 is bonded to the upper outer periphery of plug 191 and is formed of a suitable sealing material such as silicone. The lower leg portion 261 of the seal is bonded directly to the outer surface of the plug 191 and an outwardly extending flange portion 262 is adapted to fold up against the inner tapered surface of the various expanding sections, only two of which, namely section 200 and section 201 are visible in FIG. 25.

It is apparent that this flexible flange portion 262 will tend to maintain a seal with the adjacent expanding sections as the plug moves up and down with respect to the expanding sections.

Referring now to FIGS. 26–29, a modified form of the invention is shown wherein the body means 300 is substantially the same as the body means previously described, and an arm 301 is swingably supported by the body means. It is apparent that the body means and arm are provided with cooperating scales that operate in the manner previously set forth.

The body means is again provided with a suitable cut-out portion for permitting swinging of the arm with respect to the body means, and the lowermost cut-out portion within the body means is indicated by reference numeral 303.

Figures 26, 27:
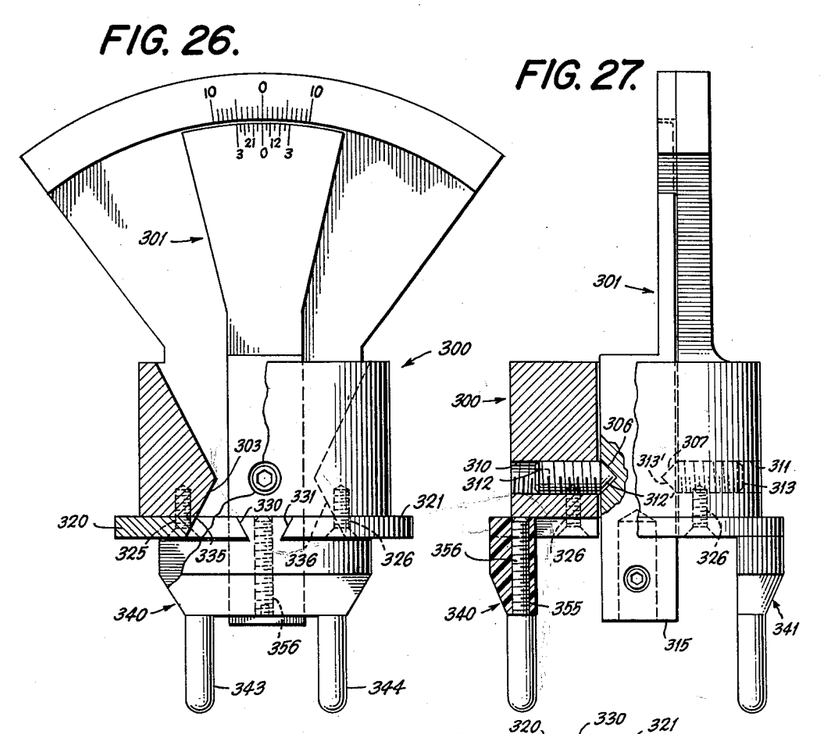
FIG. 26 is a front view of a further modification of the present invention partly broken away.
FIG. 27 is a side view partially broken away of the device shown in FIG. 26.

Referring now to FIG. 27, it will be seen that in this form of the invention, arm 301 is provided at opposite portions thereof with tapered recesses 306 and 307. Body means 300 is provided at opposite portions thereof with threaded openings 310 and 311 which receive respectively set screws 312 and 313 which are adapted to be threaded in and out of the openings as desired in a conventional manner. It will be noted that the terminal end portions 312' and 313' of the set screws are provided with tapered configurations complementary to the configuration of the openings 306 and 307 in the arm. It is evident that when the device is in the assembled position as shown in FIG. 27, the arm is pivotally supported in position by the set screws 312 and 313. The lower end portion 315 of arm 301 is also again provided with means for mounting a plug gauge therein as will be understood from the foregoing description.

Figures 28, 29:
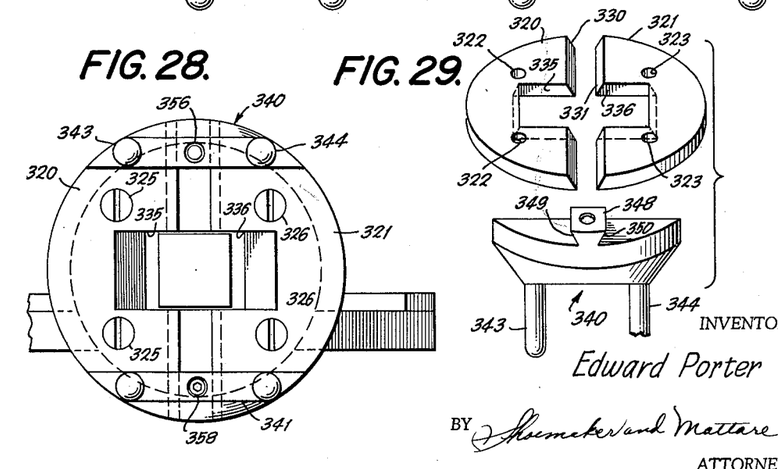
FIG. 28 is a bottom view of the device shown in FIG. 26.
FIG. 29 is an exploded perspective view illustrating the novel supporting means.
Figure 30:
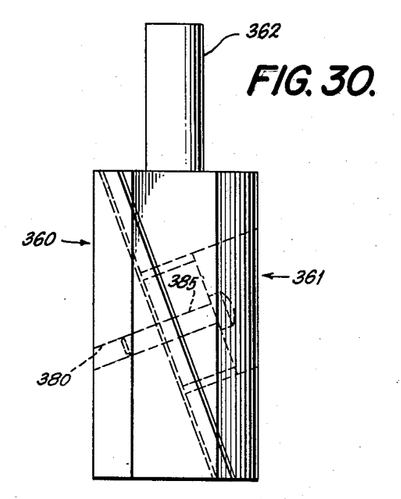
FIG. 30 is a front view of a further modified form of adjustable plug gauge.
Figure 31:
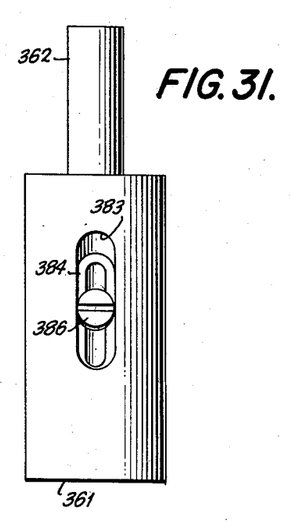
FIG. 31 is a side view of the device shown in FIG. 30.

Referring now to FIG. 29, the mode of construction of the novel support means will be more clearly understood. A pair of plates 320 and 321 are provided, these plates having spaced openings 322 and 323 formed therethrough respectively. The under surface of the body means is provided with four openings, and as will be seen in FIGS. 26 and 27, a first pair of flat head bolts 325 are employed for securing plate 320 in position while a second pair of flat head bolts 326 are employed for retaining plate 321 in operative position, bolts 325, 326 being threaded into corresponding threaded openings in the body means.

Referring again to FIG. 29 it will be seen that the opposite facing edge portions 330 and 331 of plates 320 and 321 respectively taper downwardly and inwardly such that when the plates are mounted in operative position, as seen in FIG. 26, surfaces 330 and 331 define a groove therebetween of tapered configuration.

As seen in FIG. 29, plates 320 and 321 are also provided with cut-out portions 335 and 336 respectively formed in the medial portions of the facing edges thereof. These cut-out portions accommodate swinging movement of the arm when the plates are mounted in operative position, and it will be noted from an inspection of FIG. 26 that the innermost wall portions 335 and 336 of the cut-out portions have a taper which is complementary to the walls of the cut-out portion 303 formed in the body means.

As seen in FIG. 27, a pair of support portions 340 and 341 are provided, these support portions being formed of a suitable material such as plastic or the like. The support portions are of identical construction and as seen in FIGS. 26 and 29, support portion 340 includes a pair of depending supporting legs 343 and 344 which are spaced from one another. The lower ends of these legs may be rounded as shown so as to fit on surfaces of varying contour.

As seen particularly in FIG. 29, support portion 340 has a projection 348 extending upwardly therefrom, this projection having tapered side surfaces 349 and 350. The tapered configuration of projection 348 is such that when the two plates are mounted in operative position, the projection on the support portion will be slidably received between the faces 330 and 331 of the plates as seen especially in FIG. 26. In other words, the plates define a tapered groove therebetween and the support portions are slidably adjustably mounted within this groove.

In order to retain support portion 340 in operative position, a threaded opening 355 extends upwardly therethrough, and a set screw 356 is threadably mounted therein, this set screw engaging against the under surface of the body means for locking the support portion in place. In a similar manner, a set screw 358 is threaded within a suitable threaded opening provided in support portion 341 for locking support portion 341 in the desired operative position.

It is accordingly clear that in the modification shown in FIGS. 26-29, means is provided for supporting the arm member in a novel maner by providing a pair of oppositely extending pivot mounting members which provide an almost frictionless mounting for the arm member.

In addition, the supporting means of this modification incorporates a pair of support portions which are retained in operative position by a pair of removable plates, the support portions being readily adjustable and provided with means for locking them in adjusted position.

Referring now to FIGS. 30-33, a modified adjustable plug gauge is illustrated and includes two members 360 and 361, member 361 having an integral upstanding cylindrical portion 362 which is adapted to be fitted within a socket formed in the swinging arm of the bore measuring apparatus.

Figure 32:
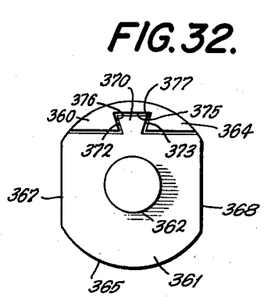
FIG. 32 is a top view of the device shown in FIG. 31.
Figure 33:
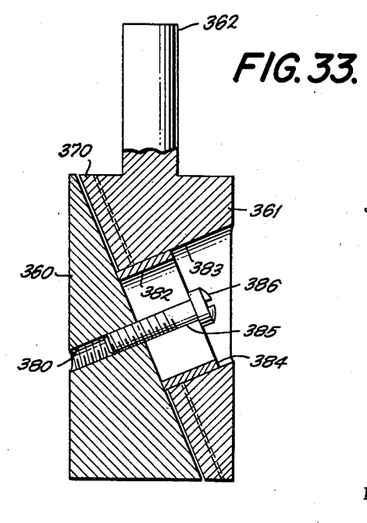
FIG. 33 is a view partially in longitudinal section through the device in FIG. 30 illustrating the details of construction.

As will be seen in FIG. 32, member 360 has an arcuate outer portion 364 while member 361 has an arcuate outer portion 365. The opposite side edges 367 and 368 of member 361 as well as the corresponding side portions of member 360 are flat as seen in FIG. 32 whereby the gauge is adapted to engage the inner surfaces of the different bores. Member 361 is provided with a rib 370 which as seen most clearly in FIG. 33 extends obliquely from the upper lefthand portion of this member as seen in FIG. 33 to the lower righthand portion of the member as seen in this figure. As seen in FIG. 32, the opposite side edges 372 and 373 of rib 370 taper inwardly toward one another to define a tapered rib. Member 360 is provided with an elongated groove 375 having opposite side edges 376 and 377 therein tapering inwardly toward one another thereby defining a tapered groove which is substantially complementary in configuration to the tapered rib formed on member 361. As seen in FIG. 33, the groove formed in member 360 extends from the upper lefthand portion of member 360 to the lower righthand portion thereof.

The tapered rib 370 is received in the tapered groove 375 and in this manner members 360 and 361 are slidably interconnected with one another. It is evident that by sliding members 360 and 361 relative to one another the outer dimension of the gauge may be adjusted. For example, if member 360 is slid upwardly to member 361 as seen in FIG. 33, the outer dimension of the over-all gauge will be increased. On the other hand, if member 360 is slid downwardly with respect to member 361 as seen in FIG. 33, the over-all dimension of the gauge will be diminished.

Member 360 is provided with a threaded opening 380 which extends obliquely therethrough as seen in FIG. 33 and which extends normally to the groove 375 formed therein. Member 361 is provided with an opening 382 formed therethrough and a counterbore 383 is provided to define a shoulder portion 384.

A bolt 385 extends through opening 382 and is threaded into opening 380. The enlarged head 386 of bolt 385 rests upon the shoulder portion 384.

It is apparent that members 360 and 361 may slidably adjusted with respect to one another and then locked in operative position by tightening up on bolt 385. When it is desired to again adjust the relative position of the members, bolt 385 may be loosened so as to permit such adjustment.

While each of the modifications of the invention has been shown as associated with a relatively flat surface, it should be understood that the supporting legs can also rest upon a curved surface, and for this purpose the lower surfaces of the supporting legs may be provided with curved configurations or other shapes in order to conform to the supporting surface. In addition, the leg portions could be other than four in number, although this arrangement is considered preferable, and three legs may be employed in certain instances for supporting the body means in operative position.

It is apparent from the foregoing that there is provided a new and novel internal bore measuring apparatus which is particularly adapted to measure several different characteristics of a bore or hole. Firstly, the apparatus is adapted to accurately check the internal diameter of the tested bore. Furthermore, the gauge means may be provided with a specific longitudinal dimension so as to accurately measure the depth of the bore. The device includes readily interchangeable and adjustable elements, and in one modification an adjustable gauge means is provided wherein the outer diameter thereof may be readily and precisely varied. The apparatus is quite simple, compact and inexpensive in construction, and yet is very accurate and reliable in operation.

As this invention may be embodied in several forms without departing from the spirit of essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Internal bore measuring apparatus including a body means, said body means having a scale formed thereon, said body means also having a slot formed therethrough, an arm member disposed within said slot and supported by said body means for pivotal movement relative thereto, said arm having a portion for cooperation with the scale of the body means for indicating the relative angular position of the arm with respect to the body means, means at the lower portion of the arm for removably attaching a plug gauge means thereto, and a plug gauge means adapted to be secured to the lower portion of said arm, said plug gauge means having a precise outer dimension for accurately checking the internal dimension of a bore to be measured, a pair of plates detachably secured to the body means and defining slot means, and a pair of separate and independent support portions, each of said support portions including depending means for engaging a supporting surface adjacent a bore to be measured, said support portions being adjustably mounted within said slot means.

2. Internal bore measuring apparatus including a body means, said body means having a scale formed thereon, said body means also having a slot formed therethrough, an arm member disposed within said slot and supported by said body means for pivotal movement relative thereto, said arm having a portion for cooperation with the scale of the body means for indicating the relative angular position of the arm with respect to the body means, means at the lower portion of the arm for removably attaching a plug gauge means thereto, and a plug gauge means adapted to be secured to the lower portion of said arm, said plug gauge means having a precise outer dimension for accurately checking the internal dimension of a bore to be measured, a pair of separate spaced plates detachably secured to the under surface of said body means, said plates defining slot means therebetween, the adjacent facing surfaces of said plates tapering downwardly and inwardly, a pair of separate and independent support portions, each of said support portions including an upper portion complementary to said slot means and received therein whereby the support portions are slidably connected with said body means, said support portions including lower portions for engaging a suitable supporting surface.

3. Apparatus as defined in claim 2, including locking means associated with each of said support portions for retaining the support portions in adjusted operative position.

4. Apparatus as defined in claim 2, wherein each of said plate portions includes a cut-out portion formed in the medial area of one edge thereof for accommodating swinging movement of said arm member.

5. Apparatus as defined in claim 2, wherein said arm member includes oppositely facing tapered recesses, and a pair of pivot mounting members removably mounted in said body means, said pivot mounting members including tapered portions received in said tapered recesses for pivotally supporting said arm member.

References Cited in the file of this patent

UNITED STATES PATENTS

| | | |
|---|---|---|
| 1,417,001 | Volis | May 23, 1922 |
| 1,852,760 | Sisson | Apr. 5, 1932 |
| 2,397,492 | Koning | Apr. 2, 1946 |
| 2,546,532 | Wade | Mar. 27, 1951 |
| 2,557,702 | Soukup et al. | June 19, 1951 |
| 2,694,261 | Dulligan | Nov. 16, 1954 |
| 2,767,478 | Adams | Oct. 23, 1956 |
| 2,787,865 | Gross | Apr. 9, 1957 |